Patented May 19, 1953

2,639,242

UNITED STATES PATENT OFFICE 2,639,242

ACID-RESISTANT WET STRENGTH PAPER

Tzeng-Jiueq Suen, Stamford, Conn., assignor to American Cyanamid Company, New York, N. Y., a corporation of Maine No Drawing. Application August 14, 1950, Serial No. 179,386

1 Claim. (Cl. 117—155)

This invention relates to a cellulose product having relatively high wet strength in the presence of acid and more particularly, to acid-resistant wet strength paper.

In the past, fibers of cellulosic material have been treated with various synthetic resinous materials, i. e., urea-formaldehyde resin, melamine-formaldehyde resin and the like, to produce cellulose products of improved wet strength and other physical properties. Such cellulosic products, however, and particularly those containing urea resin, have not always proved to have satisfactory wet strength in the presence of acid.

It is an object of the present invention to prepare an acid-resistant wet strength paper.

Another object of the present invention is the preparation of a cellulose product containing fibrous cellulosic materials, said products having good wet strength.

It is another object of the present invention to prepare an acid-resistant cellulosic product by treating fibrous cellulosic material with a modified phenolic resin.

The above and other objects are attained by treating fibers of cellulosic materials such as paper stock with a water-soluble condensation product of a phenol, formaldehyde and a water-soluble salt of an aminocarboxylic acid.

The invention will be described in greater detail in conjunction with the following specific example in which proportions are given in parts by weight. It should be understood that it is not intended to limit the scope of the invention to the details set forth in the example which is merely illustrative.

EXAMPLE

Preparation of resin 94 parts (1 mol) of phenol
121.7 parts (1.5 mols) of formaldehyde, 37% aqueous solution
17.8 parts (0.5 mol) of beta-alanine
48.8 parts (1.2 mols) of sodium hydroxide, 5 N aqueous solution
77 parts of water The above ingredients are mixed together in a suitable vessel, heated at reflux for 35 minutes and then cooled to about 25° C. The water-soluble product has a Gardner-Holdt viscosity at 25° C. of Z1–Z2. The resin is diluted with water to a 10% solution.

Preparation of wet strength paper

Unbleached kraft pulp is treated with the resin as prepared above in an amount of 3% of resin solids, based on the weight of dry pulp, together with 3% of alum. A sheet is formed on a British Handsheet machine and the formed sheet is cured at 105° to 110° C. for 2 minutes and at 260° F. for 10 minutes. The wet strength of the finished sheet having a basis weight of 45 lbs. (25 in. x 40 in.—500) is 4.8 lbs. per inch.

Upon soaking the treated sheet of paper in an aqueous acid solution, such as a 5% citric acid solution having a pH of 1.8 or a buffered solution of potassium acid phthalate and hydrochloric acid having a pH of 3.0, or about 25° C. for a prolonged period of time, i. e., upwards of a week or two, no substantial loss in wet strength is observed.

Fibrous cellulosic materials such as kraft stock, rag, soda, sulfate, groundwood, Asplund, sulfite stock, and the like, may be treated with my modified phenolic resins to prepare the new products of the present invention. This treatment preferably takes place during the preparation of the stock in the usual processes of paper manufacture, i. e., the resin is added to paper stock in the beater, stock chest, Jordan engine, heat box or any other suitable point ahead of the paper-making wire or screen. The treated fibers are then treated by any suitable felting, molding or pressing process, and the resin is finally cured by heat. The invention is not limited, however, to such processes for treatment of the cellulosic fibers and if desired, the resin treatment may take place as, for example, a tub size, after formation of the paper sheet.

The modified phenolic resins are applied in aqueous solution, which may be a colloidal or a true solution, preferably at any point during the preparation or pretreatment of the stock prior to the actual formation of the sheet or mold product, after which the felted product is heated to cure the resin. The actual sheeting or forming step may be carried out by any known or approved method; thus, for example, paper may be formed on the wire of a Fourdrinier machine or on a cylindrical machine with or without recirculation of the "white water", or by pressing or molding of the resin-treated fibrous cellulosic material by any other suitable method.

The present invention contemplates the treatment of cellulosic material with from about 1–10% resin solids, based on weight of dry pulp, of modified phenolic resin, and I prefer the use of from about 3–5%. If less than 1% of resin is used, very little wet strength results; if more than about 10% is used, little advantage over the use of about 10% or less is realized.

The drying of the resin-treated paper or other felted material may be carried out by passing the paper over heated drums in the usual manner. In some cases alternative or supplementary curing methods may be used; thus, for example, a moving sweep of the paper may be passed across a battery of infrared lamps or other heating elements of the radiant heat type. In general, the resin should be thoroughly cured without over-drying the cellulosic material, and this can be accomplished by heating at from 80°–150° C., the preferred range being about 105°–110° C. About 2–10 minutes is generally required for a thorough cure at these temperatures. Air drying at room temperature, i. e., about 25° C., will effect some curing of the resin but maximum wet strength will not result. If desired, the resin-treated cellulosic material may be cured by heating at extremely high temperatures such as about 200° C. for 1–2 seconds or even less, and high wet strength material is thereby obtained.

The treated paper may be given any suitable finishing or converting step such as surface coating with clay, calcium carbonate, satin white and the like.

The application of finishing agents of the type of glue, glue-formaldehyde, casein, casein-starch, wax size and the like as a tub size to paper prepared from stock containing the modified phenol-formaldehyde resin further improves physical properties of the finished sheet such as elongation, wet tub, tear resistance, and the like.

Stock used in the manufacture of wrapping paper, paper towels, hanging paper, heavy bag paper, shaped paper articles such as paper plates, box board, wall board and the like may be treated with modified phenolic resins to produce the products of the present invention. In general, the products of the present invention are useful where coloration of the paper is not important. My new products are particularly useful in the manufacture of bags for shipping citrus fruits or fertilizers, for garbage can liners, and the like because the wet strength of the paper is not affected to any appreciable extent by dilute acid.

The modified phenolic resins used to prepare the new products of the present invention include condensation products of phenols such as phenol itself, the cresols, the xylenols, resorcinol, and mixtures thereof, with formaldehyde and a water-soluble aminocarboxylic acid. Resins prepared from a monohydric phenol alone are slow curing and primarily for that reason resorcinol is preferably used in admixture with the monohydric phenol. Obviously other of the polyhydric phenols such as catechol, hydroquinone, pyrogallol, and the like which increase the rate of cure of phenol-formaldehyde resins may be used in place of resorcinol, if desired, but they are generally too expensive to be practicable.

The proportion of resorcinol to monohydric phenol in mixtures thereof may be varied from one extreme to the other; thus, monohydric phenol or resorcinol alone may be used. However, when less than about 0.2 mol of resorcinol per mol of monohydric phenol is used, the effect on the rate of curing of the monohydric phenol is slight. On the other hand, the use of more than about 1 mol of resorcinol per mol of monohydric phenol is uneconomical. In general, therefore, I use molar proportions of from about 0.2:1 to about 1:1, resorcinol to monohydric phenol, and I prefer using a molar proportion of about 3:7.

Water-soluble organic amine, ammonium and alkali metal salts of aminocarboxylic acids having a hydrogen atom attached to the amino-nitrogen are generally useful as modifiers for the phenolic resins. Examples of such aminocarboxylic acids include glycine, sarcosine, the alpha and beta-alanines, glutamic acid, amino-fatty acids such as beta-amino butyric acid and the like, aromatic aminocarboxylic acids such as anthranilic acid, and the like, etc. The triethylamine, triethanolamine, ammonium, sodium, potassium and other alkali metal salts of the foregoing acids are contemplated.

The water-soluble salts of the aminocarboxylic acids actually take part in the condensation reaction and form a part of the resin structure. They are not merely condensation catalysts although they may double as reactant and catalyst both. Molar proportions of aminocarboxylic acid relative to phenol or phenol and resorcinol will generally vary from about 0.01:1 to about 0.3:1.

The condensation products may be prepared by simultaneous condensation of a monohydric phenol, formaldehyde, and water-soluble salt of aminocarboxylic acid. If resorcinol is used, it is preferably added after this condensation since it reacts so much more quickly than a monohydric phenol with formaldehyde that a resorcinol-formaldehyde condensation product would otherwise be formed. The steps of condensing and reacting may, however, be carried out consecutively or simultaneously, and they are preferably carried out in aqueous solution. If desired the resinous condensate may be converted to a solid by spray or drum drying.

As an alkaline catalyst in promoting the initial reaction there may be used any basic substance such as sodium, potassium or ammonium hydroxide, quaternary ammonium hydroxides, sodium carbonate, lime, sodium sulfite, triethanolamine, etc. A pH between 8 and 11 is preferred in the initial stages.

Formaldehyde is most conveniently used in the form of the usual commercial aqueous solution, but it may also be used in the form of a polymer such as paraformaldehyde or a formaldehyde-yielding material such as hexamethylene tetramine. Relative molar proportions of phenol to formaldehyde are not a critical factor. More formaldehyde than 1:1 must be used; any excess may be used. I prefer, however, for practical reasons only, a maximum of about 3:1 so the preferred range is from about 1:1 to 3:1, formaldehyde:phenol.

The resins used in the preparation of the products of the present invention are soluble in water and in hydroxylated solvents such as the monohydric alcohols, polyhydric alcohols including glycols and glycerine, mixtures of various alcohols, mixture of alcohols and water, etc.

I claim:

An acid-resistant wet strength paper made by incorporating into said paper an aqueous solution of a water-soluble resin, and curing the paper at 105–110° C. for about 2 minutes, said resin being a condensation product formed by refluxing an alkaline aqueous solution containing reactive ingredients consisting of formaldehyde, phenol, and beta-alanine in the mol ratio of 1.5:1.0:0.5, respectively, said paper undergoing substantially no loss in wet strength on being immersed for about one week in a 5% citric acid solution having a pH of about 1.8.

TZENG-JIUEQ SUEN.

References Cited in the file of this patent

UNITED STATES PATENTS

| Number | Name | Date |
| --- | --- | --- |
| 2,247,772 | D'Alelio | July 1, 1941 |
| 2,373,547 | D'Alelio | Apr. 10, 1945 |

FOREIGN PATENTS

| Number | Country | Date |
| --- | --- | --- |
| 557,182 | Great Britain | Nov. 9, 1943 |